United States Patent Office 3,264,949
Patented August 9, 1966

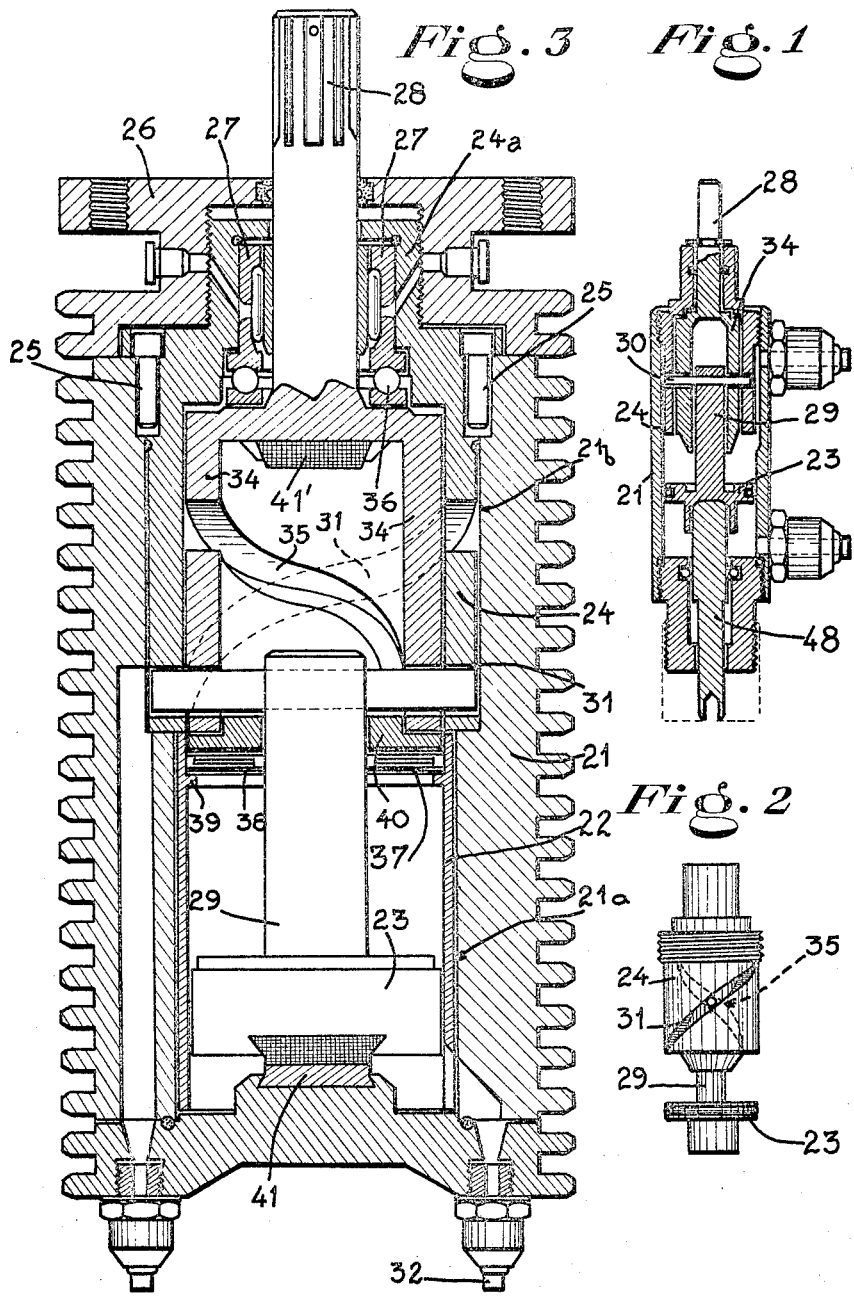

3,264,949
APPARATUS FOR TRANSFORMING A RECTILINEAR MOVEMENT INTO A ROTARY MOVEMENT
Jacques Dietlin, 26 Rue Berlioz, Nice, France
Filed Feb. 14, 1964, Ser. No. 344,955
Claims priority, application France, Feb. 15, 1963, 7,179; Jan. 20, 1964, 7,339
2 Claims. (Cl. 92—31)

The present invention has for its object the control of the modifications in the running conditions of automatized machines by means of a simple and compact apparatus driven by compressed air or the like gas, which apparatus may be operated from a distance.

Said improved apparatus includes chiefly a stationary cylinder inside which a piston is shifted by a compressed fluid and is associated with a driven shaft coaxial with said piston, while helical guiding means having an elongated pitch are provided between the driven shaft and the piston axially with reference to the cylinder, whereby the movement of the piston under the action of the compressed fluid is transformed directly into a rotary movement of the driven shaft through a predetermined angle, said rotary movement being adapted to control the automatized machine through the agency of a rotary or translationally moving transmission incorporating in the latter case a crank and a connecting rod.

In the accompanying drawings illustrating by way of example various embodiments of the invention.

FIG. 1 shows in axial sectional view a first embodiment of the invention,

FIG. 2 is an elevational view of a part of the apparatus illustrated in FIG. 1,

FIG. 3 is an axial cross-section on a larger scale of an arrangement similar to FIG. 1 wherein the channels urging compressed fluid onto the piston have been shifted.

In FIG. 3, the outer cylindrical casing 21 is constituted by two sections of which one, 21a, including a lining 22, forms a cylinder enclosing the piston 23, while the other section 21b encloses a cylindrical sleeve 24 which is rigidly secured to the said section 21b by the pins 25 screwed into said parts 21b and 24 after the manner of a stud bolt. The sleeve 24 includes a part of a reduced diameter 24a the outer thread of which carries the cover 26 screwed thereon while its inner bore serves as a bearing for the bush 27 inside which the driven shaft 28 is adapted to revolve. The rod 29 of the piston 23 carries a transverse pin 30 the ends of which engage slidingly helical long-pitched grooves 31 formed in the sleeve 24. Fluid under pressure may be fed in alternation onto the opposite sides of the piston through the agency of pipes such as 32 serving alternatingly for the admission and for the exhaust into the atmosphere and consequently the piston 23 while it moves along its axis is simultaneously shifted into rotation through engagement between the guiding grooves 31 and the pin 30. On the other hand, the driven shaft 28 includes a hollow cylindrical section 34 of a larger diameter, which is fitted revolvably inside the sleeve 24 and is provided with helical slots 35 through which the pin 30 extends. The pitch of said slots 35 is the same as that of the grooves 31 in the stationary sleeve 24, but of an opposite direction. It will be readily understood that when the piston moves and the pin executes a helical movement along the stationary grooves 31, said pin will act on the walls of the slots formed in the cylindrical section 34 of the shaft so that the latter is constrained to revolve without it being simultaneously constrained to move axially as would occur if the pin 30 were to pass simply through an annular opening in said section 34. In order to prevent such an axial movement as might be produced by the friction of the pin against the edges of the slot 35 in the section 34 of the shaft, the latter is held between two thrust bearings of which one 36 engages the bush 27 carrying the shaft while the other thrust bearing 37 engages with the interposition of a diaphragm 38 an annular shoulder 39 on the sleeve 22. Said diaphragm and also the member 40 closing the end of the shaft section 34 are provided with a central opening affording a free passage with a clearance for the piston rod 29. Elastic cushions 41 and 41' damp the shocks at the corresponding ends of the reciprocatory stroke of the piston.

FIGS. 1 and 2 illustrate on a smaller scale a similar arrangement wherein the admission pipes for the compressed fluid are arranged otherwise. FIG. 2 is an outer view of the inner mechanism of the arrangement after removal of the outer casing 21 and it shows the reversed arrangement of the two helical grooves or slots of which one 31, is illustrated in solid lines while the slot 35 in the movable shaft section 34 is illustrated in dot-and-dash lines. The slots 31 and 35 have been omitted from FIG. 1, in order to avoid the confusion of too many lines. A stop constituted by a screw 48 (FIG. 1) is screwed from the outside so as to adjust the inner end of the stroke of the piston 23.

What I claim is:

1. A rotary actuator comprising a cylinder, a piston reciprocable in the cylinder, means for supplying fluid to and removing fluid from the cylinder on opposite sides of the piston, the piston having a piston rod having a lateral projection thereon that extends in opposite directions from the piston rod, means fixed relative to the cylinder and providing a pair of helical recesses in which opposite ends of said projection are disposed, a driven member, and means mounting the driven member for rotation relative to the cylinder coaxially of the piston rod, the driven member having a pair of helical recesses in which portions of said projection on opposite sides of the piston rod are disposed, the helical recesses of said driven member being wound oppositely to said fixed helical recesses, said driven member having a hollow sleeve, said helical recesses of said driven member extending through said hollow sleeve, the piston rod being reciprocable in said hollow sleeve.

2. A rotary actuator as claimed in claim 1, and resilient bumper means in said cylinder and in said hollow sleeve at opposite ends of the path of movement of the piston and piston rod for cushioning contact with the piston and piston rod.

References Cited by the Examiner
UNITED STATES PATENTS

| | | | |
|---|---|---|---|
| 226,591 | 4/1880 | Barrie | 92—31 |
| 679,421 | 7/1901 | Halsey | 92—31 |
| 1,801,633 | 4/1931 | Mackirdy | 92—31 |
| 1,946,309 | 2/1934 | Coffman | 92—31 |
| 2,284,358 | 5/1942 | Baer | 92—31 |
| 2,458,458 | 1/1949 | Wright | 92—33 |
| 2,672,308 | 3/1954 | Farrell | 92—33 |
| 2,936,737 | 5/1960 | Miller | 92—31 |
| 2,959,064 | 11/1960 | Geyer | 92—33 |
| 3,143,932 | 8/1964 | Lanman | 92—31 |
| 3,165,982 | 1/1965 | Taylor | 92—33 |
| 3,186,311 | 6/1965 | Carlson | 92—33 X |

MARTIN P. SCHWADRON, *Primary Examiner.*

SAMUEL LEVINE, *Examiner.*

H. G. SHIELDS, *Assistant Examiner.*